Dec. 13, 1938.  L. E. HUNTLY  2,139,826
FISH POLE HOLDER
Filed Jan. 2, 1937

Inventor
L. E. Huntley
By Arthur H. Sturges
Attorney

Patented Dec. 13, 1938

2,139,826

UNITED STATES PATENT OFFICE 2,139,826

FISH POLE HOLDER

Lee E. Huntley, Bellevue, Nebr.

Application January 2, 1937, Serial No. 118,878

1 Claim. (Cl. 248—44)

This invention relates to the piscatorial art and more particularly to devices for supporting fishing poles in a selected fishing position upon the banks of a stream or the like.

It is an object of the present invention to provide a relatively simple fishing pole holder, which is compact in order that it may be easily carried, a holder which may be quickly and easily set up in position for use, and one which when set up will afford a substantial support for the fishing pole and which is adapted to enhance the enjoyment of night fishing particularly.

The invention further aims at the provision of a structure which may be made in the embodiment capable of use with a plurality of like structures and fishing poles, wherein the poles may be independently mounted and removed from their respective device, each device being provided with means adapted to engage the ground for preventing rotary movements of said devices and the poles carried thereby, whereby a battery of poles may be radially disposed from a centrally positioned fisherman and readily handled without an entanglement of the fishing lines whereby a comparatively large area of the fishing surface of a stream or pond may be simultaneously fished.

A still further object of this invention is to provide a fishing pole support with a particular arrangement of socket or pole engaging portion disposed so that an initially vertically positioned fishing pole may be quickly and easily lowered and fitted into the socket in the nighttime or darkness at times when the operator is unable to visualize said socket, the latter holding the pole in fishing position firmly, and which may be quickly and easily removed from the socket by merely raising the pole in the natural movement of withdrawing the fishing line from the water or the pole partially raised and swung side-wise for setting the hook into the fish while the butt of the pole is positioned in a portion of said socket, the latter providing a fulcrum point for swinging said pole at said time.

With the foregoing and other objects in view the invention will be more fully described hereinafter and will be more particularly pointed out in the claim appended hereto.

In the drawing wherein like symbols refer to like or corresponding parts throughout the several views.

Figure 1:
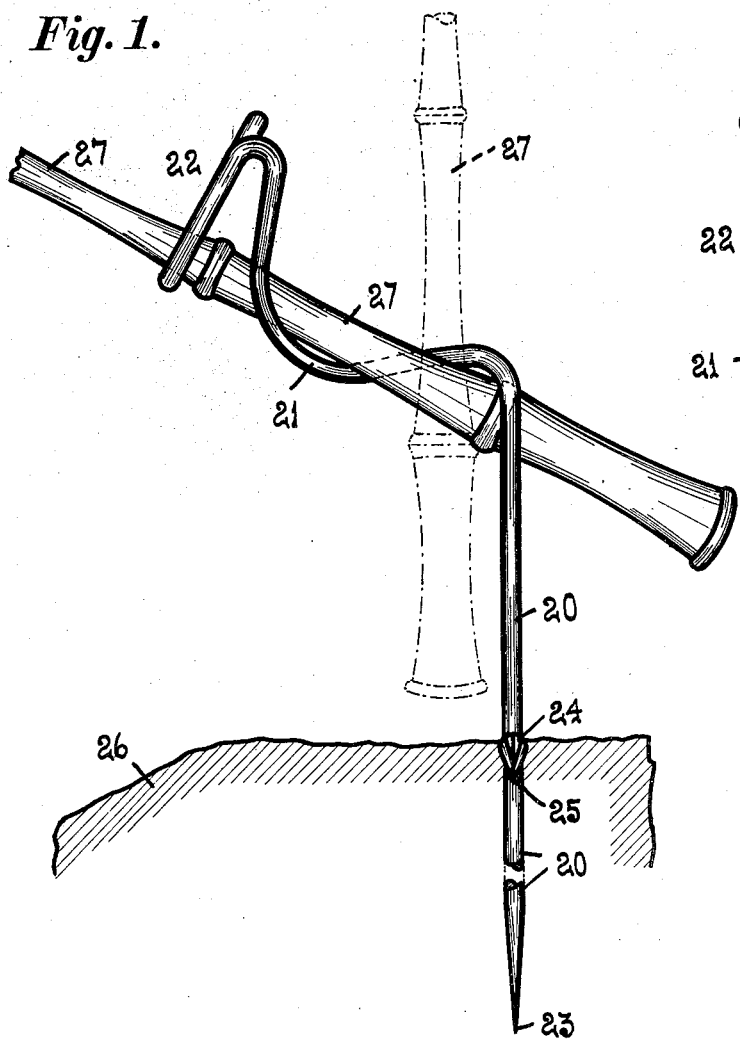
Figure 1 is a side elevation of a fishing pole holder constructed according to the present invention and showing fragmentarily a fishing pole mounted in the holder in fishing position.

Referring to the drawing, 20 indicates a standard, 21 a loop and 22 a yoke, said members being formed of an integral rod bent between its ends to provide the standard 20 and the elongated spiral loop 21 carried thereby, said loop being disposed in angular relation with respect to said standard, the free end of the loop being further bent to provide the yoke 22, the latter being transversely disposed with respect to the axis of said loop.

Figure 2:
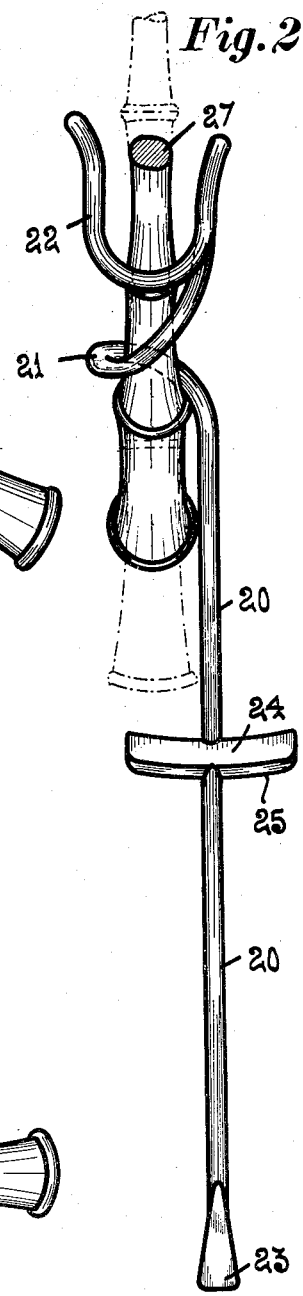
Figure 2 is a front elevation of the same.
Figure 3:
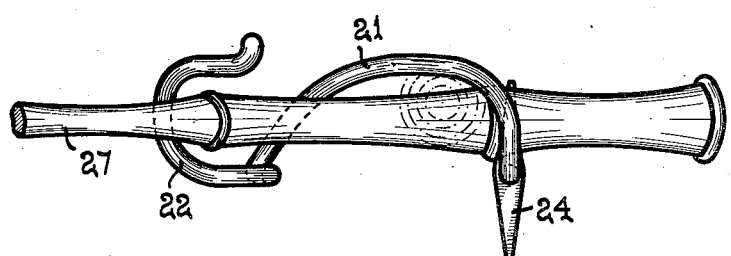
Figure 3 is a top plan view of the holder and the pole engaged therein.

The side walls of the yoks 22 are outwardly divergent with respect to each other for providing a wide mouth for the substantially U-shaped yoke as shown in Figure 2.

The free or ground engaging end of the standard 20 is preferably sharpened to a spade shape or chisel edge indicated at 23 and between the ends of the body portion of said standard a transversely disposed blade 24 is provided secured to said standard, the bottom of said blade having a sharpened edge 25.

In use the standard is driven substantially vertically into the ground and this operation may be facilitated by the operator placing one of his feet upon the member 24, the latter also being driven into the ground for preventing rotary movements of said standard and causing said loop to be maintained in a selected position with respect to the ground or bank 26 of a stream, whereby a plurality of the devices may be positioned with their loops 21 radially disposed from a common center and secured to said bank.

In operation the butt of a fishing pole, such as the pole 27, is placed vertically and in substantial vertical parallelism with respect to the standard 20 as indicated by the dotted line in Figure 1 and moved horizontally toward and within the plane of the loop while held vertically, the elongated open side of said loop facilitating the operation at times when the device is practically invisible as during night fishing operations. The spiral wall of the loop and the elongated open side thereof facilitates guiding said butt within the elongated loop, and within the plane of the convolution thereof.

The operator now may lower the upper free end of the fishing pole, to which the fishing line is attached, downwardly and in substantial alignment with the standard 20 and the yoke 22, the latter receiving said pole while the spiral wall of the loop forces the butt of the pole against the standard 20 as shown in Figure 2 for locking the pole to the holder in a removable fishing position, the side walls of the yoke 22 preventing movements of the pole in substantially a horizontal direction while said yoke, in conjunction with said loop, and the portions thereof which adjoin the standard 20, cooperate in preventing movement of said pole further downwardly in a vertical direction for maintaining said fishing position of the pole. From said fishing position the free end of the pole may be swung upwardly sufficient to clear the yoke; whereupon the pole may be moved sidewise for setting the fish-hook into the mouth of a fish, said loop where it is joined to the standard functioning as a fulcrum point for said swinging and setting operation which may be consummated with one hand if desired.

I do not wish to be restricted to the size, form and proportions of the various parts, and obviously changes could be made in the construction herein described without departing from the spirit of the invention, it being only necessary that such changes fall within the scope of the appended claim.

I claim:

A fish pole holder, comprising a single length of wire having a straight end portion with a flattened tapering extremity providing a standard for engagement in the ground to support the holder, a transversely disposed blade secured across the standard in spaced relation to the tapering extremity thereof for engaging in the ground adjacent the surface level thereof to steady the holder, said length of wire having its intermediate portion spirally looped laterally and downwardly from the upper end of the standard with the axis of the spiral inclined upwardly at an obtuse angle from the standard and with the outer end of the spiral loop extending upwardly at one side of the axis thereof, the other end portion of the wire being looped downwardly and transversely from the upwardly extending outer end of the spiral loop to provide an upwardly opening yoke, said spiral loop providing a continuous inclined support for a fish pole engaging across the upper and lower sides thereof at spaced points and said yoke engaging the pole to hold the same in substantially axial alinement in the spiral loop.

LEE E. HUNTLEY.